Sept. 25, 1945.   H. P. BIRKEMEIER   2,385,602
FISH HOOK
Filed May 31, 1943
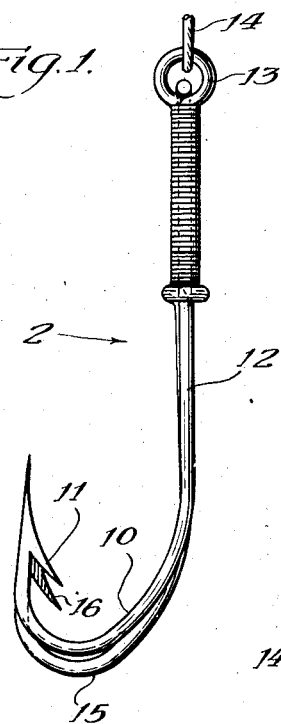
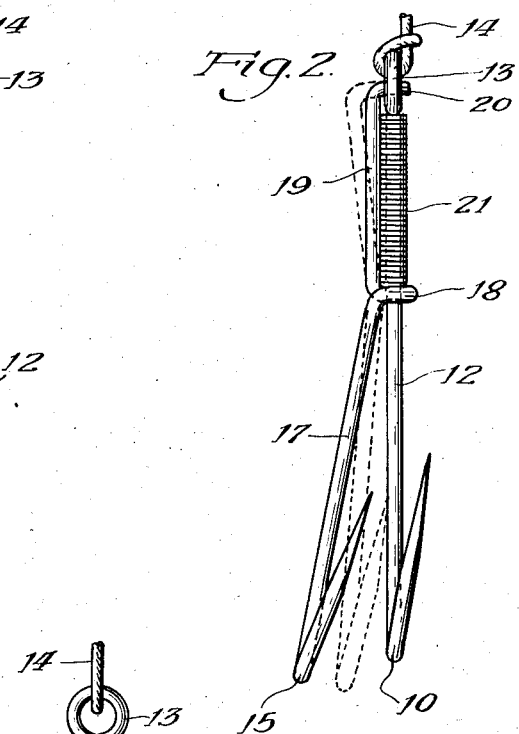
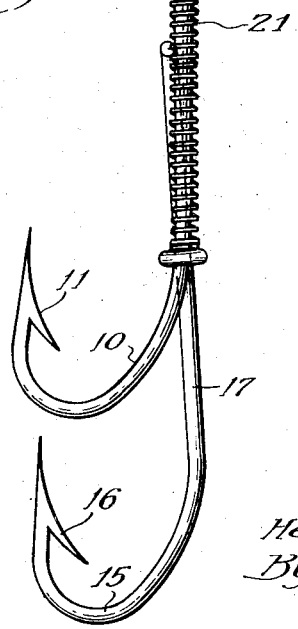
Inventor:
Henry P. Birkemeier
By: [signature]
Attorney Patented Sept. 25, 1945

2,385,602

UNITED STATES PATENT OFFICE 2,385,602

FISHHOOK

Henry P. Birkemeier, Chicago, Ill.

Application May 31, 1943, Serial No. 489,105

7 Claims. (Cl. 43—37)

My invention relates to fish hooks of the multiple, relatively movable type and is more particularly concerned with an arrangement which provides substantial assurance that the fish is incapable of throwing the hook after striking.

Many attempts have been made to produce a satisfactory, multiple hook structure in which one hook is arranged for movement relative to another hook, the relative movement being controlled by the pull of a fish or possibly a trip line. Generally speaking, these prior efforts may be grouped as follows: those structures in which all of the hooks are taken by the fish and are then swung inwardly or outwardly, or rotated, as the case may be, by the efforts of the fish to break free, and those in which the fish strikes a primary baited hook and releases an auxiliary hook which is intended to be driven into the body of the fish from an external position. In the former group, the hooks engage the mouth wall about the same distance inwardly of the mouth and there is accordingly some uncertainty as to whether the hooks will be firmly established or embedded, particularly with fish having tender mouths, while, in the second group, the ability of the auxiliary hook to effectively snag the body of the fish depends upon the latter's position at the instant when the hook is released for movement.

It is therefore the principal object of my invention to provide a multiple fish hook in which the hooks are simultaneously taken by the fish, with one hook arranged for a relative endwise and driven movement further into the interior of the fish.

A further object is to devise a fish hook having the characteristics indicated above which is easily set for use, is speedily and easily tripped for action by the fish, and does not require any change in fishing technique.

These and further objects of my invention will be set forth in the following specification, reference being had to the accompanying drawing, and the novel means by which said objects are effectuated will be definitely pointed out in the claims.

In the drawing:

Fig. 1 is a side elevation of my improved multiple fish hook in set position.

Fig. 2 is a view of the device looking in the direction of the arrow 2 in Fig. 1 and showing, in dotted outline, the position temporarily assumed by the auxiliary hook when tripped.

Fig. 3 is a view similar to Fig. 1, but showing the extended and final working position of the auxiliary hook.

Referring to the drawing, the numeral 10 designates a primary hook having the usual barb 11 and shank 12 which terminates in an eye 13 for attachment to a line 14. An auxiliary hook 15 lies adjacent the hook 10 and also includes a barb 16 and a shank 17 which angles towards the shank 12 and is provided with a loop 18 which extends around and in guiding relation to the shank 12. The remainder of the shank 17, identified by the numeral 19, extends upwardly beside the shank 12 and its end is formed as a latch finger 20 which projects through and is held in the eye 13 when the device is set by means of a helical spring 21 which encircles the shank 12 between the loop 18 and eye 13, the spring being under compression in the set position. While in Fig. 2, the hook 15 is illustrated as extending slightly beyond the hook 10, their relative positions in this respect may be adjusted as desired, although good results have been obtained with the arrangement shown, i. e., generally side by side. The spacing of the hooks laterally may depend upon the size of the hooks employed, or the nature of the fish, or both, but it will be understood that, in any case, the spacing of the hooks is such as to permit grasping of both hooks by the fish.

In using the device, both hooks may be baited in the usual manner and the hook 15 is set by inserting the finger 20 through the eye 13, thus placing the hooks in the full line positions illustrated in Fig. 2 and compressing the spring 21. When the fish strikes, both hooks enter the fish's mouth and the gripping action causes the hook 15 to move towards the hook 10 sufficiently to withdraw the finger 20 from the eye 13, whereupon the spring 21 drives the hook 15 further into the gullet of the fish and thus materially reduces the leverage which the fish can exert in trying to throw the hooks. The initial movement of the hook 15 is essentially of a pivoted nature due to the substantially pivotal connection between the loop 18 and shank 12 and the endwise movement of the hook 15 is guided by the loop 18 sliding along the shank 12. The barb 11 prevents complete separation of the two hooks, although in actual fishing, it is likely that movement of the hook 15 would be stopped when the loop 18 reaches some point on the curved portion of the hook 10 short of the barb, unless the hook 15 has been firmly embedded in the fish in some intermediate position. In any case, my improved fish hook insures a multi-piercing of the mouth and gullet wall of the fish in such spaced locations lengthwise of the fish as to definitely prevent attempts of the fish to throw or break loose from the hooks.

I claim:

1. A fish hook structure comprising a pair of normally juxtaposed hooks, the shank of one hook being arranged for connection to a line and the other hook being releasably latched to and guidable on the shank, and spring means for effecting a substantially endwise movement of the pointed end portion of the other hook beyond the line connected hook and further inwardly of the fish when unlatched.

2. A fish hook structure comprising a pair of normally juxtaposed hooks adapted to be grasped by a fish, the shank of one hook being arranged for connection to a line and the other hook being substantially pivotally connected to and guidable on the shank, means for latching the hooks in juxtaposed position and releasable when the hooks are relatively moved towards each other by the strike of a fish, and spring means for effecting a substantially endwise movement of the other hook inwardly of the fish when the latch means are released.

3. A fish hook structure comprising a primary and an auxiliary hook normally disposed side by side in spaced relation and adapted to be grasped by a fish, the shank of the primary hook being arranged for connection to a line and the other shank having a loop extending around the first named shank for substantially a pivotal and guiding connection therewith, means for latching the hooks in side by side relation and releasable when the hooks are relatively moved towards each other by the strike of a fish, and spring means for effecting a substantially endwise movement of the auxiliary hook inwardly of the fish when the latch means are released.

4. A fish hook structure comprising a primary and an auxiliary hook normally disposed side by side in spaced relation and adapted to be grasped by a fish, the shank of the primary hook having an eye for connection to a line and the other shank having a loop extending around the first named shank for substantially a pivotal and guiding connection therewith, a latch finger on said other shank extending through the eye to maintain the hooks in juxtaposed position and withdrawable when the hooks are relatively moved towards each other by the strike of a fish, and spring means for effecting a substantially endwise movement of the other hook when the finger is withdrawn.

5. A fish hook structure comprising a primary and an auxiliary hook normally disposed side by side in spaced relation and adapted to be grasped by a fish, the shank of the primary hook having an eye for connection to a line and the other shank having a loop extending around the first named shank for substantially a pivotal and guiding connection therewith, a latch finger on said other shank extending through the eye to maintain the hooks in side by side relation and withdrawable when the hooks are relatively moved towards each other by the strike of a fish, and a helical spring encircling the primary shank between the eye and loop and loaded when the finger extends through the eye.

6. A fish hook structure comprising a pair of normally juxtaposed hooks adapted to be simultaneously grasped by a fish, the shank of one hook being arranged for connection to a line and the other hook being arranged for a driven, endwise movement relative to the first hook for embedment further inwardly of the gullet of the fish.

7. A fish hook structure comprising a pair of normally juxtaposed hooks, the shank of one hook having an eye for connection to a line and the other hook being releasably latched in the eye and guidable on the shank, and spring means for effecting a substantially endwise movement of the other hook beyond the line connected hook and further inwardly of the fish when unlatched.

HENRY P. BIRKEMEIER.